United States Patent [19]

Carvel

[11] Patent Number: 4,956,980

[45] Date of Patent: Sep. 18, 1990

[54] APPARATUS FOR PRODUCING SOFT SERVE DAIRY PRODUCTS, IN PARTICULAR YOGURT

[75] Inventor: Thomas A. Carvel, Ardsley, N.Y.

[73] Assignee: Carvel Corporation, Yonkers, N.Y.

[21] Appl. No.: 429,303

[22] Filed: Oct. 30, 1989

[51] Int. Cl.⁵ .............................................. A23G 9/16
[52] U.S. Cl. ...................................... 62/342; 366/322; 366/325
[58] Field of Search .................... 62/342, 343; 366/90, 366/322, 325, 330

[56] References Cited

U.S. PATENT DOCUMENTS

| | | | |
|---|---|---|---|
| 2,191,344 | 2/1940 | Erickson et al. | 62/343 |
| 2,281,944 | 5/1942 | Miller et al. | 62/342 |
| 2,488,668 | 11/1949 | Knibb | 62/342 |
| 2,491,852 | 12/1949 | Carvel | 62/342 |
| 2,538,716 | 1/1951 | Wakeman | 62/342 X |
| 3,018,641 | 1/1962 | Carpigiani | 62/342 |
| 3,035,420 | 5/1962 | Stoelting et al. | 62/342 |
| 3,188,826 | 6/1965 | Carpigiani | 62/342 X |
| 3,455,700 | 7/1969 | McMichael et al. | 62/342 X |
| 3,464,220 | 9/1969 | Phelan | 62/342 |

FOREIGN PATENT DOCUMENTS 494346  7/1953  Canada .................................. 62/342

OTHER PUBLICATIONS

Photograph of soft serve Machine.

*Primary Examiner*—William E. Tapolcai
*Attorney, Agent, or Firm*—Lawrence E. Apolzon

[57] ABSTRACT

An apparatus for producing soft serve dairy products, especially yogurt, and comprising a freeze barrel having an inlet spaced about one-fourth of the barrel length from a rear end wall of the freeze barrel, and a beater shaft assembly which includes a square shaft, at least four blade elements mounted on the four faces of the square shaft, respectively, and four pairs of spaced pins projecting a successively radially from the four faces of the square shaft for supporting the four blade elements, respectively, on the shaft and arranged along the shaft with a first pin of the first pair of pins being located about halfway between the rear end wall of the barrel and the barrel inlet and with a first pin of each successive pair of pins except the second pair of pins being spaced slightly beyond a second pin of a preceding pair of pins in a direction toward the front end wall of the freeze barrel.

5 Claims, 3 Drawing Sheets

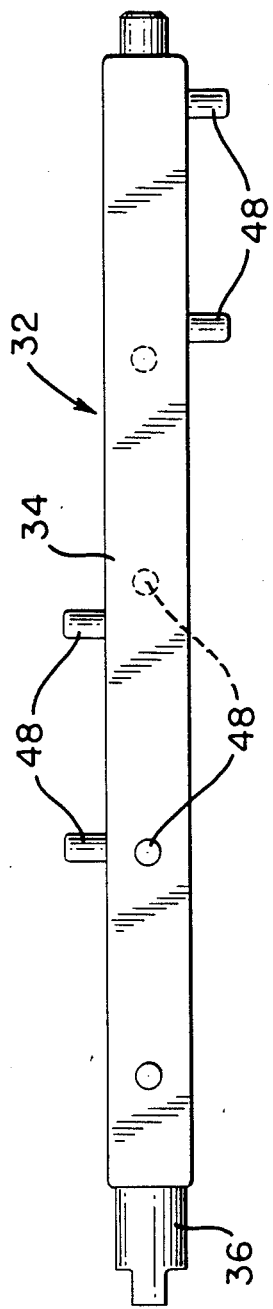
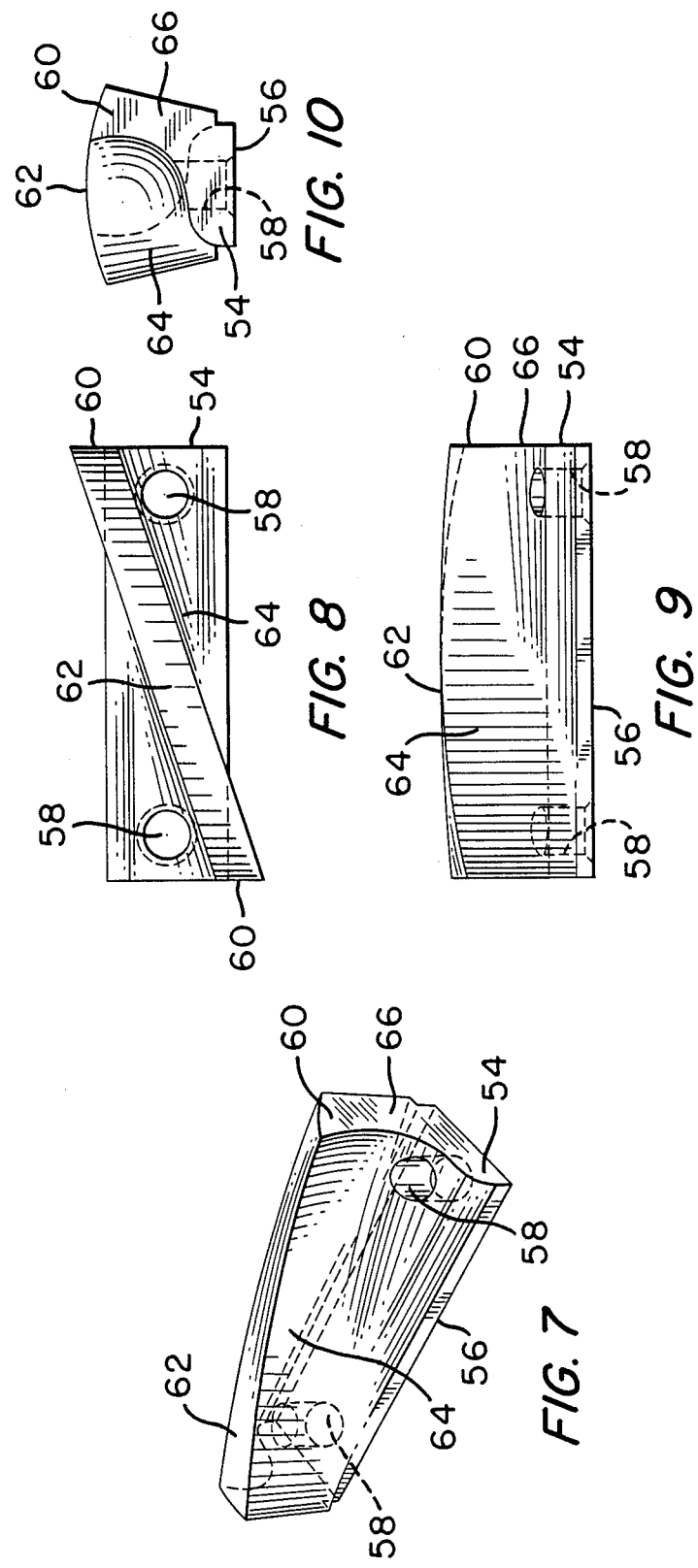

2

APPARATUS FOR PRODUCING SOFT SERVE DAIRY PRODUCTS, IN PARTICULAR YOGURT

BACKGROUND OF INVENTION

The present invention relates to an apparatus for producing soft serve dairy products, in particular yogurt. High quality yogurt is especially difficult to produce because of high demands to its smoothness, creaminess, and consistency.

Apparatus for producing soft serve dairy products are known. The main parts of such apparatus are a hollow freeze cylinder or a barrel and a motor driven so-called beater shaft assembly located inside of the cylinder for advancing a product mix from an inlet port to an outlet port while whipping and mixing the product mix. The beater shaft assembly includes a rotatable shaft and a plurality of blade elements mounted on the shaft for propelling the product forward and for scraping the product from the barrel wall and placing the product in the path of the propelling blades. An apparatus of this type is disclosed in U.S. Pat. No. 2,491,852 of the applicant herein. The apparatus of U.S. Pat. No. 2,491,852 comprises a hollow cylinder and a beater shaft assembly mounted inside the cylinder. The shaft assembly includes a circular shaft and a plurality of combined propeller and scraper elements mounted thereon. Each blade element includes a collar slidably mounted on shaft, a curved propeller blade extending radially outwardly from the collar, an arm also extending radially outwardly from the collar but from a side thereof which is opposite to the side from which the propeller blade extends, and a scraper member having a pair of legs for straddling the arm, a shaft extending across the leg and fittable into a semi-circular recess formed at the arm top, and a scraper component supported by the legs. As can be seen from the foregoing description, the beater shaft assembly of U.S. Pat. No. 2,491,852 is rather complex. Beside, what is more important, the apparatus of U.S. Pat. No. 2,491,852 does not permit the production of yogurt with good smoothness and consistency.

A simplified beater shaft assembly is disclosed in Canadian Patent No. 494,346 of the applicant herein. The beater shaft assembly disclosed therein includes a square shaft from the four faces of which extends radially therealong a plurality of pins arranged in pairs, and a plurality of spirally shaped blade elements mounted on respective pairs of pins. As in U.S. Pat. No. 2,491,852, the blade elements perform the propelling and the scraping functions. Each blade element has a substantially rectangular base the side edges of which substantially coincide with respective edges of the shaft. The base has a pair of spaced openings for engaging a respective pair of pins. A spiral fin or vane projects from the base body. The opposite end portions of the spiral fin or vane project beyond the side edges of the base. The blade elements are arranged progressively offset relative to each other on successive faces of the shaft in such a manner that end of one blade element extends a substantial distance beyond ends of adjacent blade elements and that the vanes form a substantially spiral formation due to the end portions of the vanes extending beyond the side edges of the base. The pairs of pins are arranged on the shaft in an overlapping manner; that is, the last pin of a preceding pair extends beyond the position of the first pin of the successive pair of pins in a direction of product mix movement. While an apparatus for producing soft serve dairy products having a beater shaft assembly of the Canadian patent has improved operational characteristics, still it was unable to produce a frozen yogurt with sufficient smoothness, creaminess and homogeneity.

The object of the invention is to provide an apparatus for producing soft serve dairy products and especially yogurt having a very good smoothness, creaminess and thorough homogeneity. Another object is to use such apparatus in a continuous serve machine.

SUMMARY OF THE INVENTION

The objects of the invention are achieved by providing an apparatus for producing soft serve dairy products, especially yogurt, which comprises a freeze barrel mounted in the apparatus housing and a front plate assembly for dispensing a ready product that is mounted over the front end of the freeze barrel, a beater shaft assembly supported in the freeze barrel and which agitates and mixes a product mix fed through the freeze barrel inlet and propels the product to the front end of the freeze barrel, and a drive assembly for driving the beater shaft assembly. The beater shaft assembly includes a square shaft, four pairs of spaced pins that project radically from four faces of the shaft, respectively, and four blade elements supported on the four pairs of pins respectively.

According to the invention, the pins extend along the shaft in the form of a spiral with a first pin of a first pair of pins being spaced from a rear end wall of the freeze barrel about half-distance between the rear end wall and the freeze barrel inlet. A first pin of each successive pair of pins, except a second pair of pins, is spaced slightly beyond a second pin of each preceding pair of pins in a direction of propelling of the product mix.

Each blade element has a unidirectional, spirally-curved longitudinal outer surface defined by a fin that projects from a base of the blade element. The base of the blade element has a substantially rectangular shape defining transverse and longitudinal edges of the base, and two spaced openings for engaging a respective pair of pins. The transverse edges of the blade element base are spaced from axes of respective openings a distance which is substantially equal to the pin diameter. The fin of the blade element has opposite outer edges that lie in planes that pass through respective end faces of the base, so that when the four blade elements are mounted on the four pairs of pins, respectively, the unidirectional spirally-curved outer surfaces of the blade elements except the first blade element form almost a perfect continuous spiral formation about the shaft. The beater shaft assembly, according to the invention, insures production of a very smooth and creamy yogurt.

Also, according to the invention, a fifth blade element may be mounted at the rear end of the shaft almost symmetrically relative to the longitudinal axis of the shaft with respect to a blade element already mounted at the shaft rear end.

This and further features and advantages of the present invention will become more apparent from the following detailed description of the preferred embodiment when read with reference to the accompanying drawings.

BRIEF DESCRIPTION OF THE DRAWINGS

FIG. 6 shows a side elevational view of the shaft of the beater shaft assembly shown in FIG. 4 with support pins projecting therefrom;

FIG. 7 shows a perspective view of a blade element of the beater shaft assembly;

FIG. 8 shows a top view of the blade element shown in FIG. 7;

FIG. 9 shows a front view of the blade element shown in FIG. 7; and

FIG. 10 shows an end view of the blade element shown in FIG. 7.

DETAILED DESCRIPTION OF PREFERRED EMBODIMENT

Figure 1:
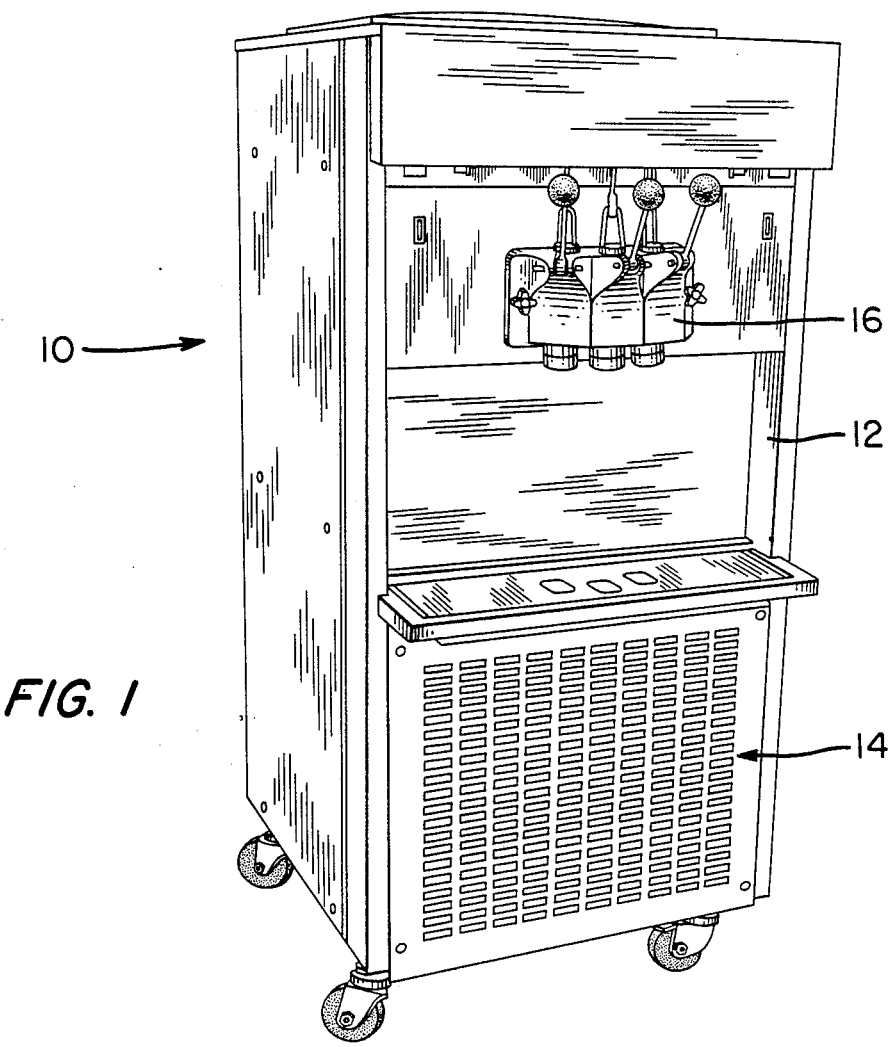
FIG. 1 shows a perspective view of an apparatus according to the present invention.
Figure 2:
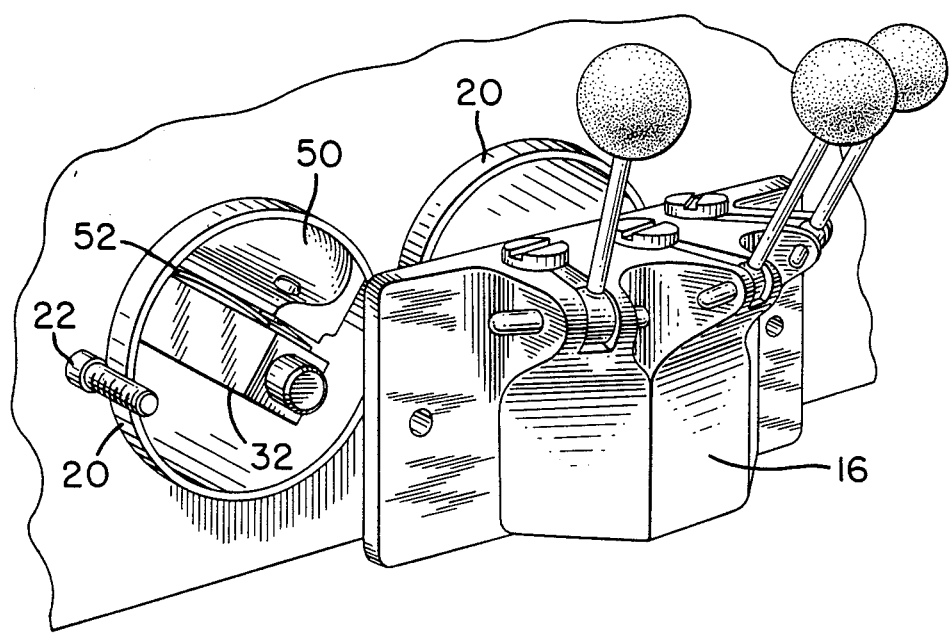
FIG. 2 shows a view illustrating the mounting of a front plate assembly for dispensing the product over the front end of the freeze barrel of the apparatus according to the present invention.

FIG. 1 shows a perspective view of an apparatus 10 according to the invention. The apparatus 10 has a housing 12. A refrigerator unit 14 is located in the lower portion of the housing 12, and a front plate assembly 16 for dispensing frozen yogurt is attached to the upper portion of the housing 12. As shown in FIG. 2, the front plate assembly 16 is mounted over front ends of freeze barrels 20 and is securely attached thereto by screws 22 (only one screw is shown).

The structure of the freeze barrel, together with a beater shaft assembly and a drive assembly for driving the beater shaft assembly, will be described with reference to FIG. 3.

The barrel 20 comprises a cylinder 22 having an inlet 24 for delivering a feed mix. The barrel 20 is secured to a mount plate 26 secured to the apparatus housing by means of a mount cylinder 28. The mount cylinder is attached to the mount plate 26 by a plurality of screws 30. The inlet 24 is located at about one-fourth of the freeze barrel length from the rear end of the freeze barrel 24 which is adjacent to the mount cylinder 28. A beater shaft assembly 32 extends through the freeze barrel 20.

The beater shaft assembly 32 includes a square shaft 34, an end portion 36 of which projects beyond the rear end wall 38 of the freeze barrel 20. A seal ring 40 provides for sealing of the shaft 34. The end portion 36 of the shaft 34 is attached by a coupling 42 to an output shaft 44 of the drive assembly 46 for driving the beater shaft assembly 32. The drive assembly 46 is mounted to the side of the mount plate 26 which is opposite to the side to which the freeze barrel 20 is attached. The drive assembly 46 includes a single or three-phase electric motor and a gear reducer (not shown). The motor and the gear reducer are conventional and do not form part of the present invention.

Figure 5:
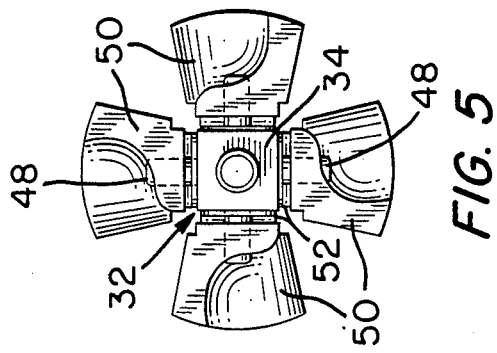
FIG. 5 shows an end view of the beater shaft assembly shown in FIG. 4.
Figure 4:
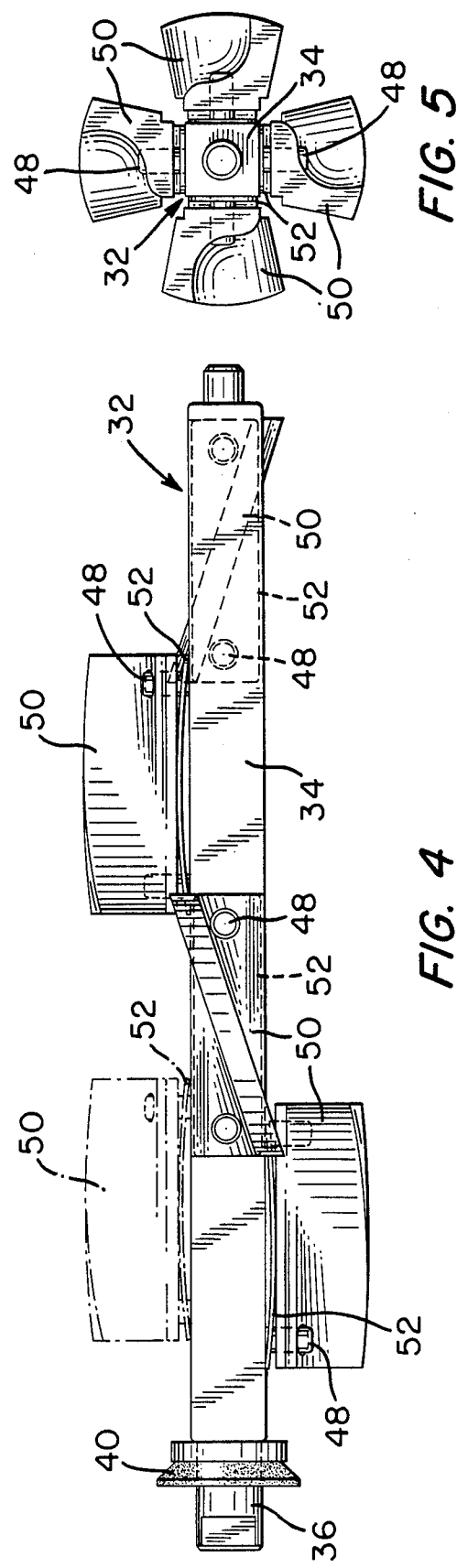
FIG. 4 shows a side elevational view of the beater shaft assembly according to the invention.

The beater shaft assembly will be described in detail with reference to FIGS. 4, 5 and 6. As it has already been mentioned, the beater shaft assembly 32 includes a square shaft 34 from each face of which projects a pair of spaced pins 48. Pins of each pair extend radially from a respective flat face of the shaft 34 with their axes lying in a plane that passes through the central longitudinal axis of the square shaft. The pins 48 extend along the shaft 34 substantially in the form of a helix. Each pair of pins supports a blade element 50, per se known. A leaf spring 52 is mounted between a flat bottom surface 56 of a base 54 of the blade element 50 and a respective flat face of the square shaft 34. The leaf springs compensate for irregularities of the inner wall of the freeze barrel 20 and flat faces of the square shaft 34.

Each blade element 50 has, as it has already been mentioned, a base 54 of a substantially rectangular shape. The width of the base 54 is chosen such that elongate edges of the base 54 substantially coincide with longitudinal edges of the square shaft 34. The base 54 is provided with a pair of spaced openings 58 for engaging a respective pair of pins 48 projecting from a respective flat face of the square shaft 34. The openings 58 have a diameter such that the pins 48 are loosely engaged to enable radial movement of the blade elements. A helical fin 60 projects from the base 54. The fin 60 has opposite vertical edges 62 that coincide with transverse end edges of the base 54. The fin 60 has a unidirectional outer spirally-curved or helical surface 62 for scraping the product from the inner wall of the freeze barrel 20 and a side helical surface 64 for propelling the product forward. As shown in FIG. 10, the opposite end faces 66 of the helical fin 60 are substantially symmetrical which permits mounting of a blade element on the shaft 34 in any position and makes the blade elements interchangeable.

Figure 3:
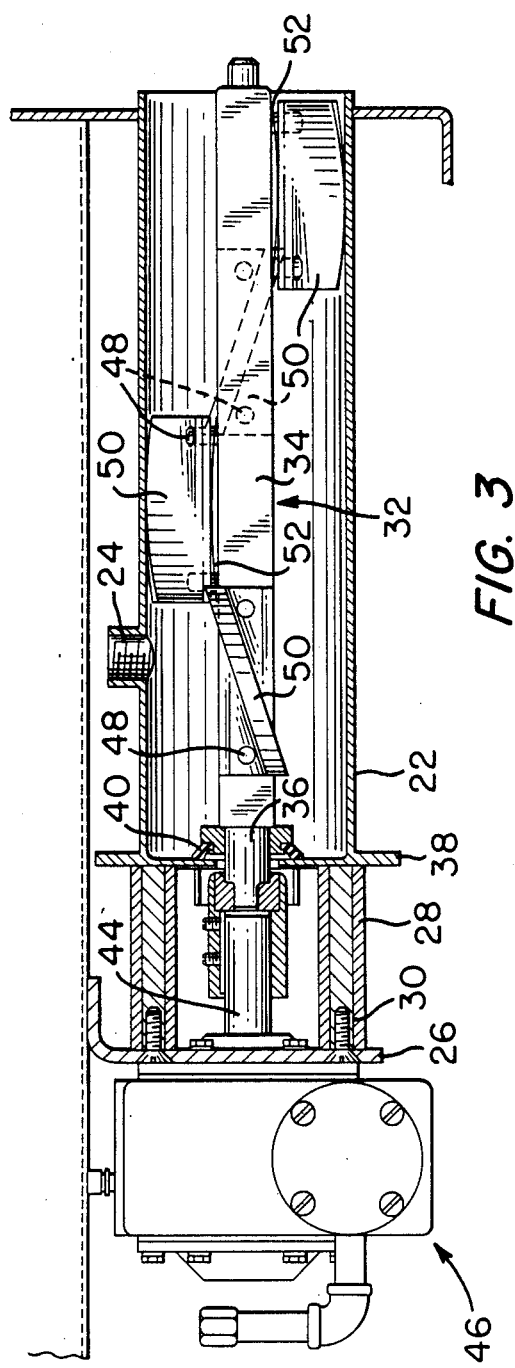
FIG. 3 shows a cross-sectional elevational view of the freeze barrel with a beater shaft assembly supported therein.

The first pin of the first pair of pins as shown in FIG. 3 extends about halfway between the rear end wall 38 of the freeze barrel and the barrel inlet 24. The first pin of an immediately following pair of pins has an axis which substantially coincides with the axis of a second pin of the first pair. The pairs of pins of successive pairs of pins are mounted on successive faces of the square shaft in such a manner that the first pin of each successive pair extends beyond an adjacent pin of the immediately preceding pair with the axes of two adjacent pins being spaced a distance approximately equal to two diameters of a pin. Due to such arrangement of the pin pairs, it is achieved that the blade elements 54 in which the distance between the transverse edge of the base and the axis of the opening through which the pin extends, is equal approximately to the diameter of the pin, when mounted on the square shaft 34, 15 form almost a perfect continuous helical formation about the square shaft 34. Such a formation promotes uniform propelling of the product forward and uniform mixing which results in a smooth and homogeneous end product. Furthermore, this arrangement enables this apparatus to be used in a continuous operation/selfserve machine.

Mounting the first pin of the first pair of pins about halfway between the end wall 38 and the inlet 24 of the freeze barrel insures that the blade element supported on the first pair of pins does not hinder delivery of the feed mix.

Generally, a shaft with four blade elements 50 which form almost an interrupted helical formation from one end of the shaft to the other end of the shaft, is used. However, sometimes a fifth blade element is used. The fifth blade element is mounted, as shown in dotted line in FIG. 4, substantially symmetrically relative to the longitudinal axis of the shaft 34 with respect to the blade element which is closest to the rear end wall. The blade elements 50 are preferably made from a plastic material, known under the trademark DELRIN, by an injection-molding process. However, using other plastic or metal materials is possible. Also, more than four blade elements may be mounted successively along the shaft.

While the present invention has been shown and described with reference to a specific embodiment thereof, it is not limited to details shown, and further modifications can be made therein without departing from the scope and spirit of the appended claims.

What is claimed is:

1. An apparatus for producing soft-serve dairy products, especially yogurt, said apparatus comprising a housing; a freeze barrel mounted in said housing and including a front end, a rear end having a rear end wall, and an inlet spaced about one-fourth of the length of said freeze barrel from said rear end wall and through which product mix is fed into said freeze barrel; a front plate assembly mounted over said front end of said freeze barrel for dispensing soft frozen product made in said freeze barrel; a beater shaft assembly supported in said freeze barrel for agitating and mixing the product mix and for propelling the product from said inlet to said front end of said freeze barrel; and a drive assembly for driving said beater shaft assembly, said beater shaft assembly including a shaft having a square cross-section and a longitudinal axis, four pairs of spaced pins projecting successively radially from four faces of said shaft, respectively, and extending along said shaft in a form of a spiral, and four blade elements supported on said four pairs of pins, respectively, with each blade element having a unidirectional spirally-curved longitudinal outer surface, said pairs of pins being arranged along said shaft with a first pin of a first pair of pins being spaced from said rear end wall about half-distance between said rear end wall and said inlet and with a first pin of third and fourth pairs of pins being spaced beyond a second pin of a preceding pair of pins in a direction of propelling of the product mix, each of said blade elements having a base and a fin projecting from said base and defining said unidirectional spirally-curved outer surface, said base having a substantially rectangular shape defining longitudinal and transverse edges of said base, and two spaced openings for engaging a respective pair of pins, said transverse edges being spaced from respective axes of said openings a distance substantially equal to a diameter of a pin, said fin having opposite outer edges that lie in planes that pass through respective end faces of said base and that extend slightly beyond respective longitudinal edges of said base so that when said four blade elements are mounted on said four pairs of pins, the unidirectional spirally-curved outer surfaces of the second and subsequent blade elements forming almost a perfect continuous spiral formation about said shaft.

2. An apparatus as set forth in claim 1 wherein a distance between axes of a second pin of the second pair of pins and a first pin of a third pair of pins and a distance between axes of a second pin of the third pair of pins and a first pin of a fourth pair of pins is equal approximately to two pin diameters.

3. An apparatus as set forth in claim 1 wherein said beater shaft assembly further includes four leaf springs and said base has a flat bottom surface, each of said four leaf springs being mounted between the bottom surface of the base of a respective blade element and a respective face of said shaft.

4. An apparatus as set forth in claim 1 wherein said fin of said blade element has opposite end faces defining said opposite outer edges, said end faces being symmetrical.

5. An apparatus for producing soft serve dairy products, especially yogurt, said apparatus comprising a housing, a freeze barrel mounted in said housing and including a front end, a rear end having a rear end wall; a front plate assembly mounted over said front end of said freeze barrel; a beater shaft assembly supported in said freeze barrel and including a shaft having a square cross-section, a longitudinal axis, front and rear end surfaces, and a stub portion projecting from said rear end surface of said shaft; and a drive assembly for driving said beater shaft assembly and having an output shaft connectible with said stub portion of said shaft; said beater shaft assembly further including a plurality of separate interchangeable spirally curved blade elements having opposite ends, said plurality of blade elements comprising first, second, third and fourth blade elements progressively mounted on respective four sides of said square shaft with opposite end portions of two adjacent blade elements extending a distance substantially equal to two lengths of a blade element and with an end surface of the first blade element being spaced a distance from said one of said rear end surface of said square shaft, and a fifth blade element mounted substantially symmetrically relative to the longitudinal axis of said square shaft with respect to said first blade element.

* * * * *